United States Patent
Kwon

(10) Patent No.: US 7,970,261 B2
(45) Date of Patent: Jun. 28, 2011

(54) METHOD AND APPARATUS FOR DETERMINING TITLE OF RECORDED CONTENT

(75) Inventor: Young Sang Kwon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1198 days.

(21) Appl. No.: 11/302,435

(22) Filed: Dec. 14, 2005

(65) Prior Publication Data

US 2006/0159420 A1 Jul. 20, 2006

(30) Foreign Application Priority Data

Dec. 15, 2004 (KR) ........................ 10-2004-0106084

(51) Int. Cl.
- *H04N 5/76* (2006.01)
- *H04N 5/78* (2006.01)
- *H04N 5/84* (2006.01)
- *H04N 5/445* (2011.01)
- *H04N 7/16* (2011.01)
- *H04N 7/20* (2006.01)
- *H04N 7/173* (2011.01)
- *H04N 9/475* (2006.01)
- *H04J 3/00* (2006.01)

(52) U.S. Cl. ........ 386/293; 386/350; 386/324; 386/334; 348/512; 370/498; 725/39; 725/41; 725/56; 725/58; 725/145

(58) Field of Classification Search ................ 386/83, 386/68, 95, 125, E5.043, E9.013; 348/512, 348/E5.009, E5.099, E5.102, E5.105, E5.108, 348/E7.002, E7.004; 375/E7.022, E7.023, 375/E7.278; 370/498; 725/39, 41, 56, 58, 68, 71, 112, 145
See application file for complete search history.

(56) References Cited

U.S. PATENT DOCUMENTS

| | | | | |
|---|---|---|---|---|
| 5,929,790 | A * | 7/1999 | Lim | 341/22 |
| 6,101,195 | A * | 8/2000 | Lyons et al. | 370/498 |
| 6,909,879 | B1 * | 6/2005 | Centore, III | 455/63.1 |
| 7,257,313 | B2 * | 8/2007 | Jeong | 386/68 |
| 2004/0060076 | A1 * | 3/2004 | Song | 725/145 |
| 2004/0237108 | A1 * | 11/2004 | Drazin et al. | 725/56 |
| 2005/0152678 | A1 | 7/2005 | Sugai et al. | 386/83 |
| 2005/0166230 | A1 * | 7/2005 | Gaydou et al. | 725/41 |

(Continued)

FOREIGN PATENT DOCUMENTS

CN 1239573 A 12/1999

(Continued)

OTHER PUBLICATIONS

European Search Report dated May 28, 2008.

(Continued)

*Primary Examiner* — Thai Tran
*Assistant Examiner* — Syed Y Hasan
(74) *Attorney, Agent, or Firm* — KED & Associates, LLP

(57) ABSTRACT

An apparatus and method thereof determines a title of a recorded program. After a desired video content that is transmitted through a channel has been recorded upon user's request of timer recording, it is checked if more than one program is scheduled for broadcast on that channel during the preset timer recording interval based on broadcast program time information obtained from the channel. If it is determined that more than one programs is scheduled, the title of the recorded desired video content is determined on the basis of time length, data size, and/or minimum ratio.

23 Claims, 7 Drawing Sheets

U.S. PATENT DOCUMENTS

2006/0130100 A1 * 6/2006 Pentland .................. 725/68

FOREIGN PATENT DOCUMENTS

| EP | 0936811 A2 * | 8/1999 |
|---|---|---|
| JP | 11355725 A * | 12/1999 |
| JP | 2003-333479 | 11/2003 |
| KR | 10-2004-0055732 A | 6/2004 |
| KR | 10-2004-0095726 A | 11/2004 |

OTHER PUBLICATIONS

Chinese Office Action dated Jun. 27, 2008.

Korean Office Action dated Feb. 28, 2006.

* cited by examiner

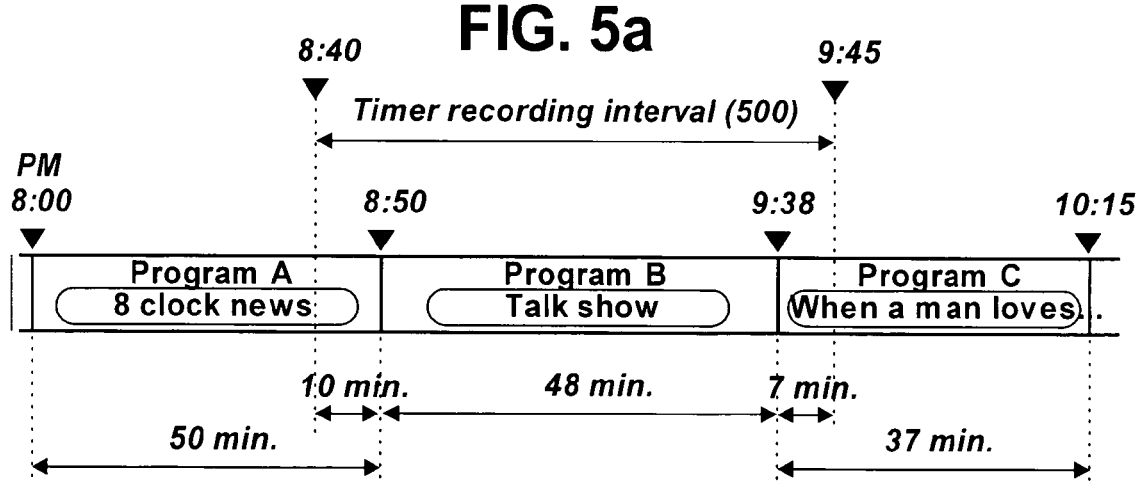

FIG. 5b
| Sequence | Channel | Program Title | Recording Time | Recording location information |
|---|---|---|---|---|
| 1 | N | "Talk Show" | PM 8:40~9:45 | addr1 |
FIG. 6
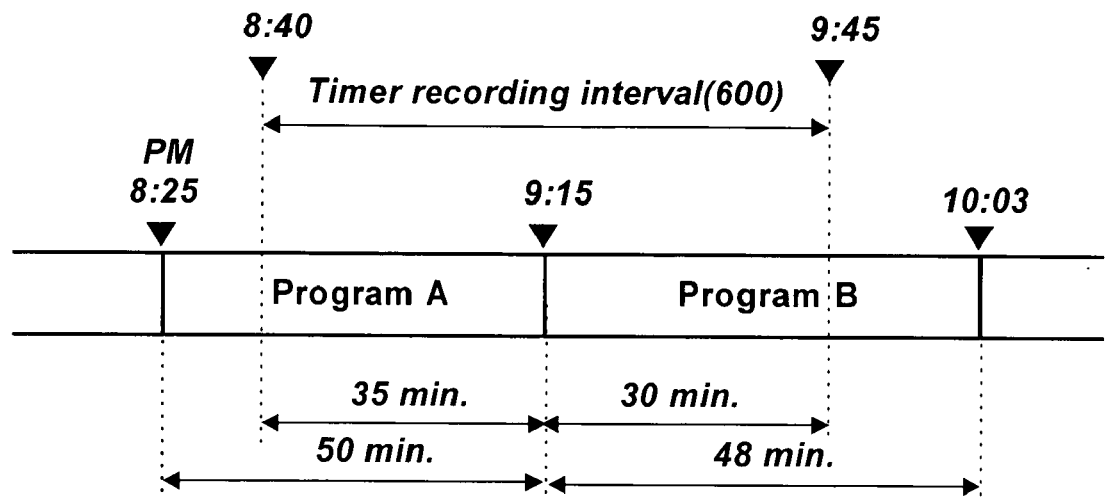
FIG. 7
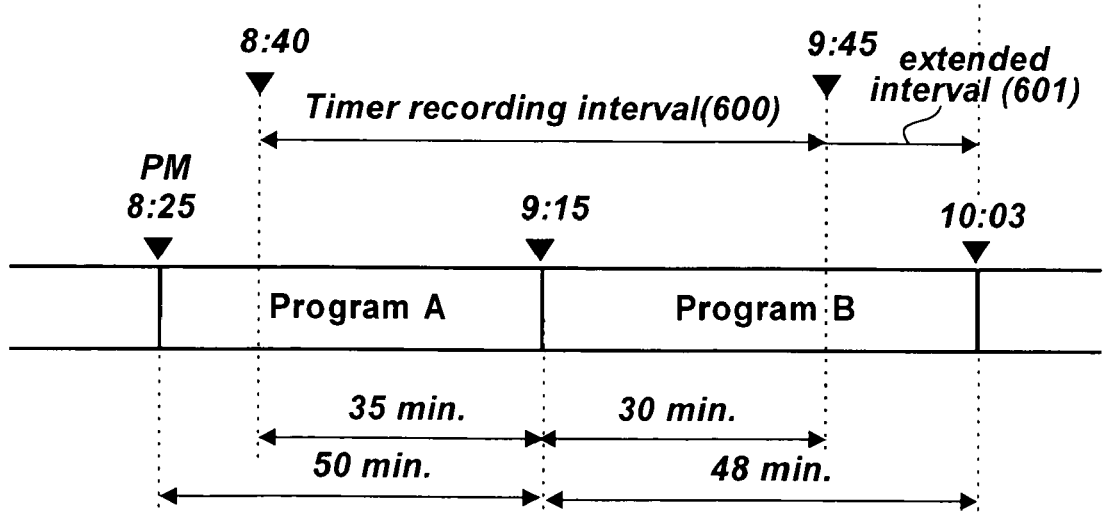

METHOD AND APPARATUS FOR DETERMINING TITLE OF RECORDED CONTENT

This application claims priority to Korean Patent Application No. 10-2004-00106084 filed on Dec. 15, 2004. The disclosures of the previous applications are incorporated by reference herein.

BACKGROUND OF THE INVENTION

1. Field of the Invention

The present invention relates to method and apparatus for a recording and/or reproducing device, and more particularly, method and apparatus determining the title of a recorded broadcast program.

2. Background of the Related Art

Since diverse programs have been offered by a lot of broadcast channels, users are often likely to use timer recording to record the programs so as to watch the recorded programs at convenient times. In order to set timer recording of a desired program, users should specify a recording start time as well as a recording end time or a recording duration time by referring to a program time table. To ensure that the entirety of the desired program is recorded during a timer recording interval, users usually specify the recording duration time that is long enough to cover the running time of the desired program in order to prevent the desired program from being recorded only partially.

SUMMARY OF THE INVENTION

An object of the invention is to solve at least the above problems and/or disadvantages and to provide at least the advantages described hereinafter.

Therefore, it is an object of the present invention to provide a method and apparatus of correctly determining the program mat users want to record among programs that have been recorded during a timer recording interval as well as the title of the program that has been recorded.

The present invention has the features that after recording a broadcast signal (video and/or audio signal) of a program that is broadcast on a desired channel during a preset timer recording interval, it is checked whether more than one program is scheduled for broadcast during the preset timer recording interval (timer recording time interval) based on broadcast program time information such as a table, and that if it is determined that more than one program is scheduled, the title of the broadcast signal or a program recorded during the preset timer recording interval is determined on the basis of a ratio of each program to the total recorded programs during the preset timer recording interval.

In one embodiment of the present invention, the title of broadcast signal or program recorded during the preset timer recording interval is determined on the basis of a ratio of time length of each program falling in the timer recording time interval to the total time length of the timer recording time interval.

In another embodiment of the present invention, the title of broadcast signal or program recorded during the preset timer recording interval is determined on the basis of a ratio of data size of each program falling in the timer recording time interval to the total size of data recorded during the timer recording time interval.

In another embodiment of the invention, the title of the program recorded during the preset timer recording interval is determined on the basis of the time location of the program interval in relation to the program switch time, program start time, and/or program end time.

In another embodiment of the invention, the length of the preset timer recording interval is extended automatically so that a program being recorded is not prematurely cut-off.

In another embodiment of the invention, the program may be first recorded onto a hard disk, then rerecorded onto another disk so that only the desired program will be rerecorded.

In still another embodiment, the broadcast program time information is obtained from data carried in packets in the digital broadcast stream that contain program information.

In yet another embodiment, the broadcast program time information is obtained by demodulating and collecting data that have been modulated with a horizontal sync signal with is located in a predetermined position during the vertical sync period in the analog broadcast signal. The objects and/or advantages may be achieved in a whole or in parts by a method of determining a title of a recorded video content, comprising based on broadcast program time information, checking if a plurality of programs are scheduled for broadcast in a preset recording interval, and if a plurality of programs are scheduled, determining a title of video content recorded during the preset recording interval based on time length of each program. The time length of each program is an overlapping time length between each program and the preset recording interval. Prior to recording of the video content, the broadcast program time information has been obtained from broadcast signal on a channel and stored in a storing means, a desired program being scheduled for broadcast on the channel. The method may further include a step of offering a user with the determined title of the recorded video content, together with its recording start and end time.

The objects and/or advantages may be achieved in a whole or in parts by a method of determining a title of a recorded video content, comprising based on broadcast program time information, checking if a plurality of programs are scheduled for broadcast in a preset recording interval, and if a plurality of programs are scheduled, determining a title of video content recorded during the preset recording interval based on a ratio of amount of each program to total amount recorded during the preset recording interval. The title of video content recorded during the preset recording interval is determined based on a ratio of time length of each program falling in the recording interval to the recording time interval. The title of video content recorded during the preset recording interval is determined based on a ratio of recorded data size of each program to total size of data recorded during the recording time interval.

The objects and/or advantages may be achieved in a whole or in parts by a receiver means for tuning a broadcast channel and extracting video data and broadcast program time information, a recording/reproducing means for recording the video data on a recording medium and reading out signal from the recording medium, a storing means for storing the extracted program time information, and a controlling means that, at beginning of a preset timer recording, controls the receiving means and the recording/reproducing means to tune a chosen channel and record a tuned signal on the recording medium, checks if a plurality of programs are scheduled for broadcast in a preset recording interval based on broadcast program time information in the storing means, and if a plurality of programs are scheduled, determines a title of video content recorded during the preset recording interval based on time length of each program.

The time length of each program is an overlapping time length between each program and the preset recording interval. The controlling means offers a user with the determined title of the recorded video content, together with its recording start and end time.

The objects and/or advantages may be achieved in a whole or in parts by a video signal recording apparatus, comprising a receiver means for tuning a broadcast channel and extracting video data and broadcast program time information, a recording/reproducing means for recording the video data to a recording medium and reading out signal from the recording medium, a storing means for storing the extracted program time information, and a controlling means that, at beginning of a preset timer recording, controls the receiving means and the recording/reproducing means to tune a chosen channel and record a tuned signal on the recording medium, checks if a plurality of programs are scheduled for broadcast in a preset recording interval based on broadcast program time information in the storing means, and if a plurality of programs are scheduled, determines a title of video content recorded during the preset recording interval based on a ratio of amount of each program to total amount recorded during the preset recording interval.

The controlling means determines the title of video content recorded during the preset recording interval based on a ratio of time length of each program falling in the recording interval to total recording time interval. Alternatively, the controlling means determines the title of video content recorded during the preset recording interval based on a ratio of recorded data size of each program to total size of data recorded during the recording time interval.

The objects and/or advantages may be achieved in whole or in parts by a method of determining a title of a recorded video content comprising a plurality of programs, comprising determining a length of time of each of the plurality of programs recorded on a recordable medium, and selecting the title of the recorded video content based on the recorded program having a greatest length of time compared to other recorded program.

The objects and/or advantages may be achieved in whole or in parts by a method of determining a title of a recorded video content including a plurality of programs, comprising determining a ratio between a data size of each recorded program to a data size of the recorded video content on a recordable medium; and selecting the title of the recorded video content based on the recorded program having a greatest ratio of the data size.

A method of determining a title of a recorded video content including a plurality of programs, comprising determining a ratio of a recorded duration of a second program to a preset recording time interval of the recorded video content on a recordable medium, and selecting the title of the recorded video content based on the second program when the ratio between the recorded duration and the preset recording time interval is greater than a prescribed threshold value.

The objects and/or advantages may be achieved in whole or in parts by a recording apparatus comprising, a receiving circuit that receives signals having program data and program information, a recording/reproducing device that records on a recordable medium, a storage device that stores program information, and a controller that controls the receiving circuit and the recording/reproducing device, wherein the controller determines a title of a recorded video content based on at least one of the following (a) determining a length of time of each of the plurality of programs recorded on a recordable medium, and selecting the title of the recorded video content based on the recorded program having a greatest length of time compared to other recorded program, (b) determining a ratio between a data size of each recorded program to a data size of the recorded video content on a recordable medium, and selecting the title of the recorded video content based on the recorded program having a greatest ratio of the data size, or (c) determining a ratio of a recorded duration of a second program to a preset recording time interval of the recorded video content on a recordable medium, and selecting the title of the recorded video content based on the second program when the ratio between the recorded duration and the preset recording time interval is greater than a prescribed threshold value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

In the drawings:

FIG. 4 illustrates a program time table that is obtained from data included in the broadcast signal;

FIGS. 5A and 5B illustrate a timer recording interval on the time axis and a recording entry with the resulting program title, respectively;

FIG. 6 illustrates one example of the timer recording interval on the time axis when a desired program has been broadcast at a later time than scheduled; and FIG. 7 illustrates another example of the timer recording interval on the time axis when the length of the present timer recording is extended automatically.

DETAILED DESCRIPTION OR BEST MODE

In order that the invention may be fully understood, exemplary embodiments thereof will now be described with reference to the accompanying drawings, which are applicable to all content (such as programs) broadcasted through any medium, such as local, cable, internet and/or satellite or other wireless transmission/reception.

Figure 1:
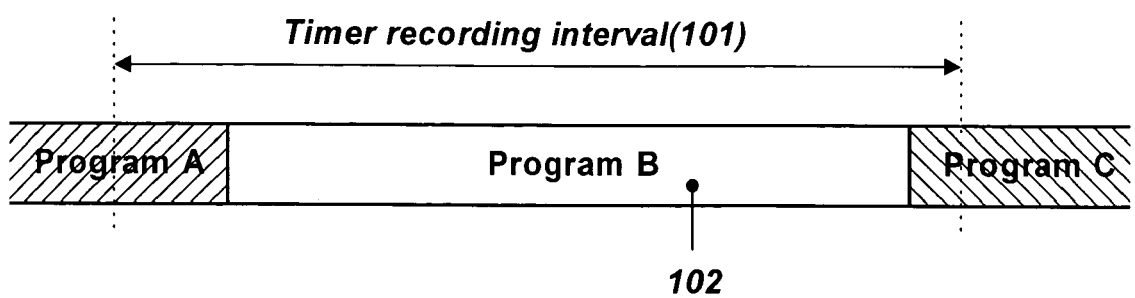
FIG. 1 illustrates one example of the timer recording interval on a time axis.

Although the user can extend the record duration, it is not, uncommon that programs are often broadcast later or earlier than scheduled. Thus, given the timer recording with the extra recording time interval, if the desired program is offered at a later or earlier time than scheduled, as shown in FIG. 1, the desired program (program B in FIG. 1) will be recorded together with the preceding and/or following programs (programs A and C) during the timer recording interval 101.

On the other hand, it is desirable that a broadcast program recording apparatus, such as disk recorder, has features such as automatically choosing the title of a recorded program and displaying the chosen titles of recorded programs so that users are able to see all recorded programs at a glance and to select the desired recorded program. Therefore, in cases where more than one program has been recorded, as shown in FIG. 1, it is desirable that the apparatus determines which program is the one that a user wanted to record as well as the title of the recorded program correctly.

Figure 2A:
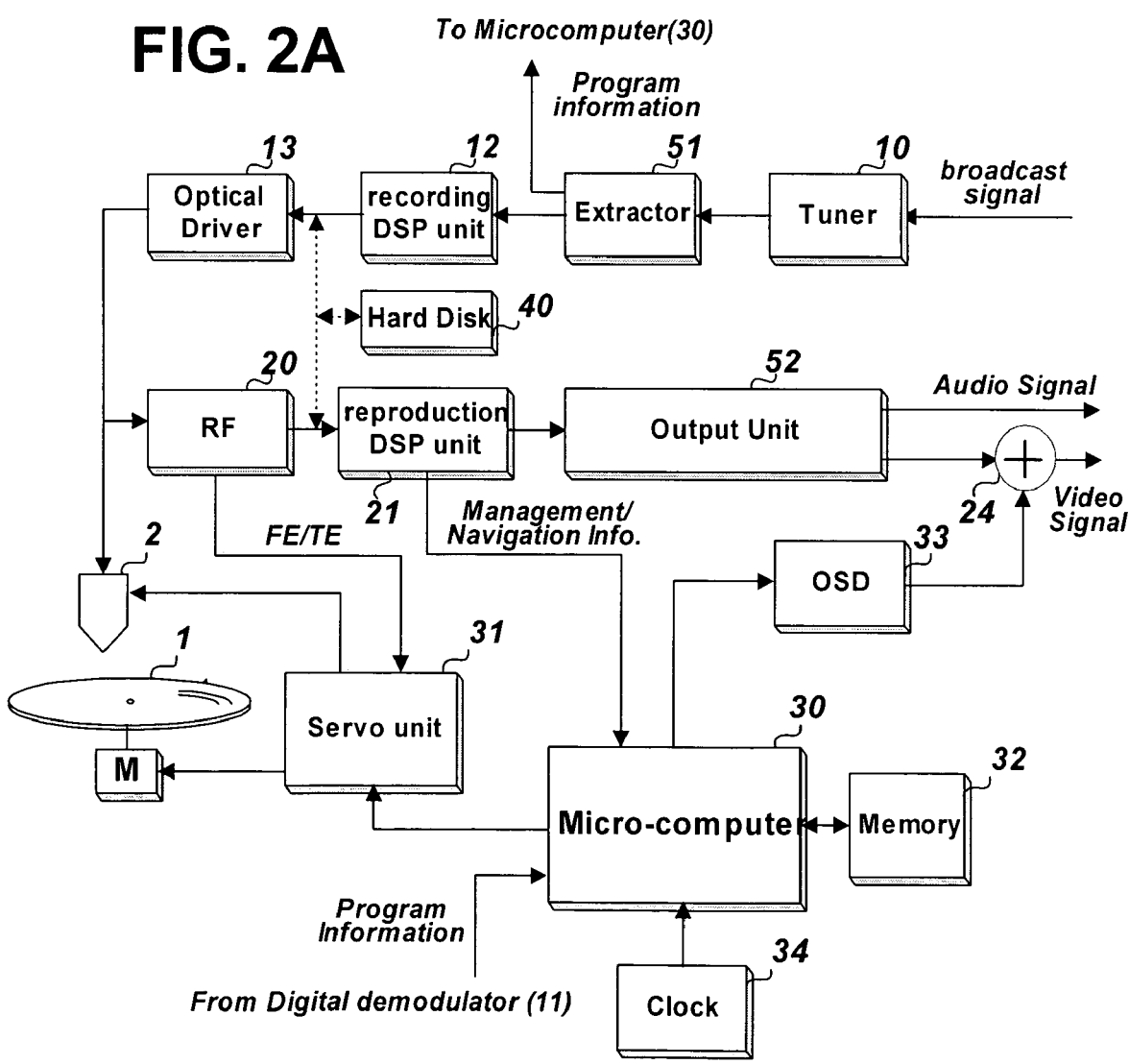
FIGS. 2A, 2B and 2C illustrate block diagrams of exemplary embodiments of an optical disk recording/reproducing apparatus according to the present invention.
Figure 2B:
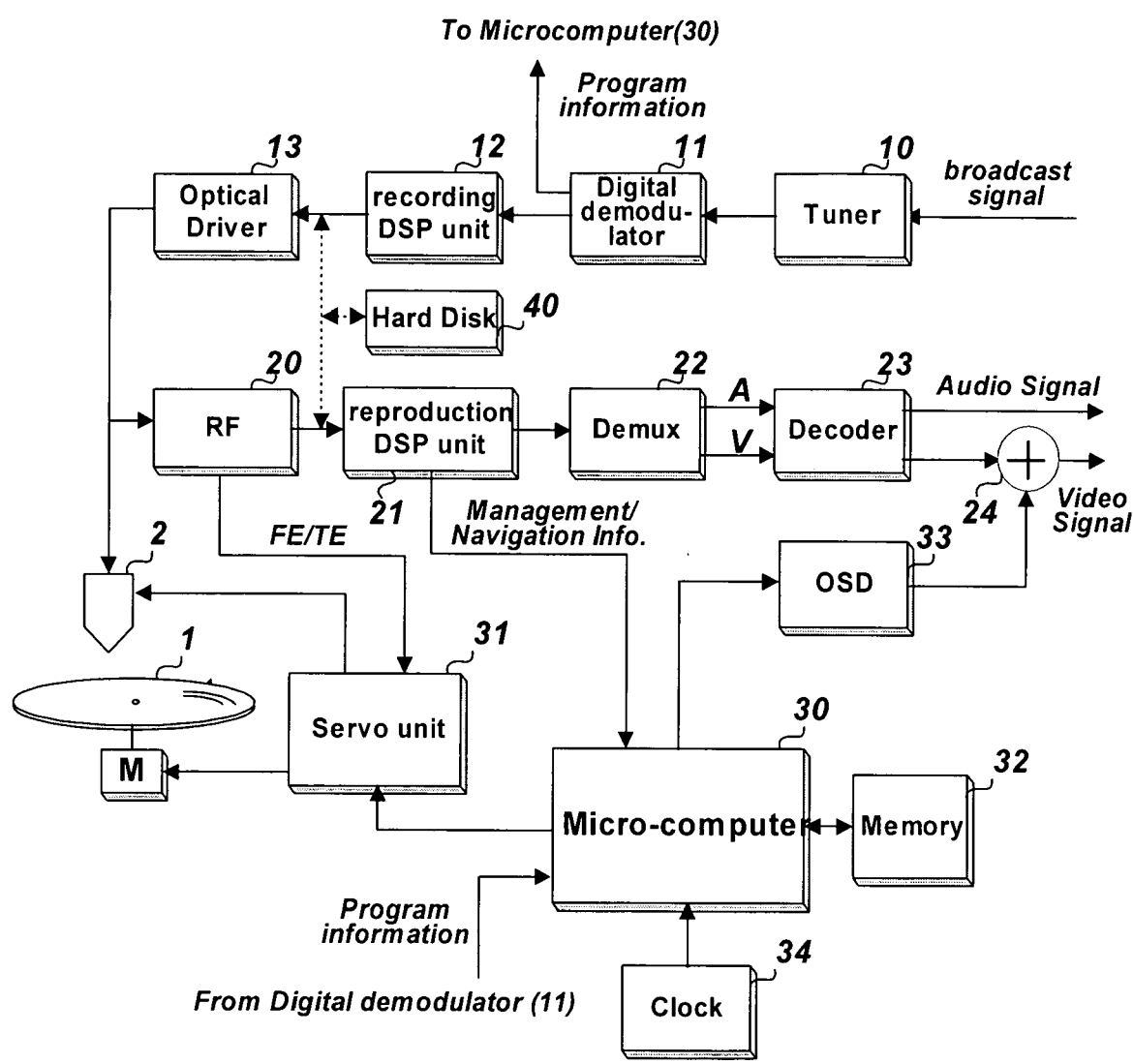
Figure 2C:
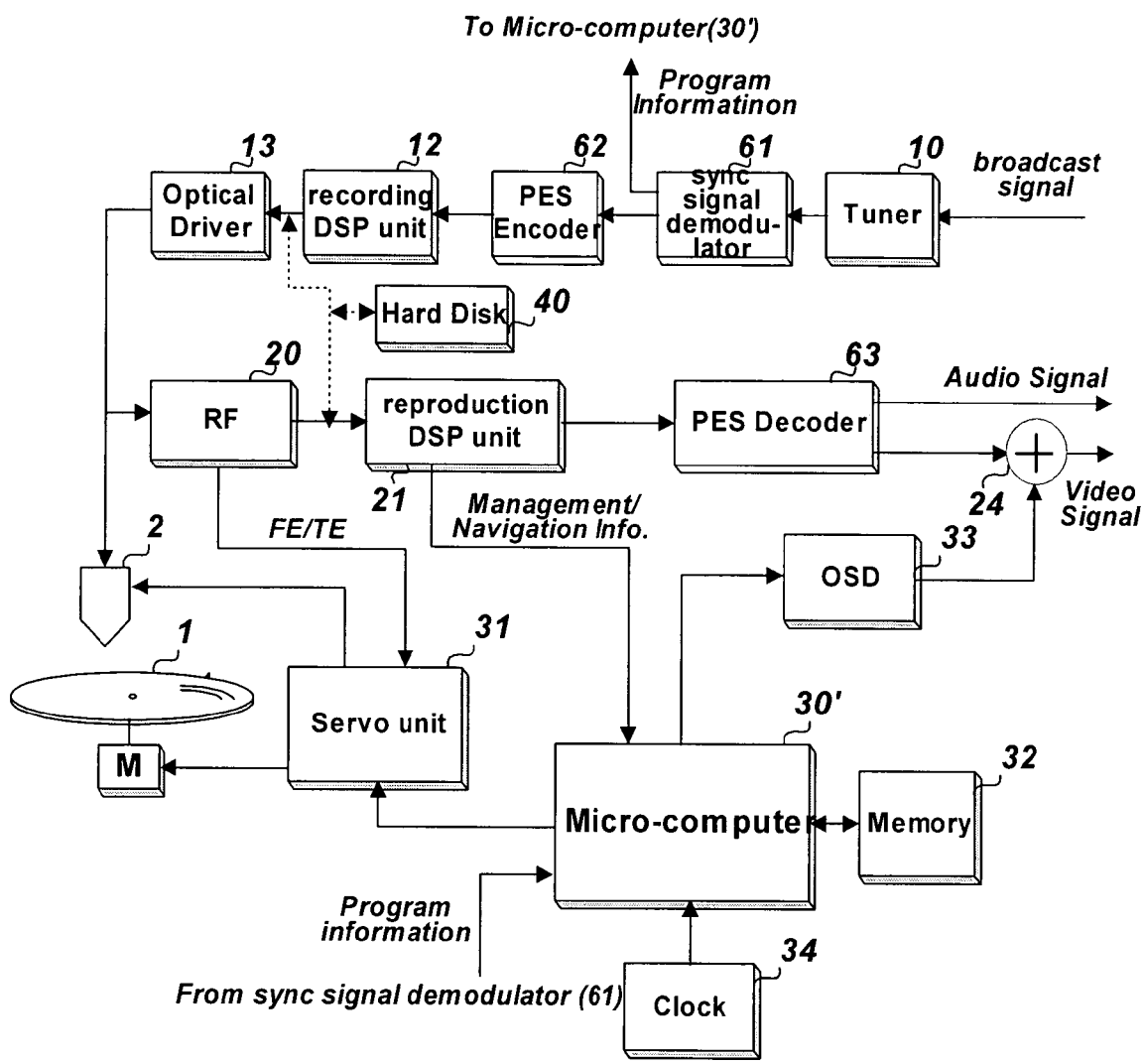

FIGS. 2A, 2B and 2C illustrate block diagrams of optical disk recording/reproducing apparatuses implementing exemplary embodiments of the present invention where FIG. 2A is a generic apparatus. Broadcast signals such as digital and/or analog signals are recorded to and reproduced from the apparatus.

As shown in FIG. 2A, a tuner 10 is for tuning a broadcast signal, which may be in digital or analog formats and a signal extraction unit 51 receives the output of the tuner. A digital signal processor 12 converts a transport packet sequence in accordance with the error correction code (ECC) format and modulates the ECC data into record-ready signals. An optical driver 13 moves an optical pickup and an optical pickup 2 reads out signals from an optical disk 1, such as DVD+/−R, and writes signal produced by the optical driver 13 into the optical disk 1.

An RF unit 20 produces a binary reproducing signal from the readout signal and generates both tracking error (TE) signal and focusing error (FE) signal, and a reproduction digital signal processor (DSP) 21 generates digital data from the binary reproduction signal. An output unit 52 receives the digital data; and an OSD signal generator 33 generates character and graphic signals. A signal summer 24 sums the video signal and the OSD output signal.

A servo unit 31 drives a spindle motor M that rotates the optical disk 1 and controls the optical pickup 2 and the laser beam of the optical pickup. The apparatus also includes a memory 32; a timer 34 for keeping the current time; and a microcomputer 30 for processing user's requests and performing recording/reproducing control operations. A hard disk 40 is optionally positioned between the recording DSP unit 12 and the reproducing DSP unit 21, and the program or other data may be optionally recorded first on the hard disk 40 or other types of suitable storage devices, before the program or other data is recorded onto the optical disk 1.

FIG. 2B shows an embodiment of the apparatus when the apparatus is to receive a digital broadcast signal. Compare to the generic apparatus of FIG. 2A, the apparatus of FIG. 2B includes a digital demodulator 11 for demodulating digital data streams, for example, transport streams from the tuned signal and examining header information of transport packets in the transport stream; a demux 22 for demuxing transport streams from the digital data into encoded audio/video streams and extracting management and navigation information from the digital data; and an A/V decoder 23 for decoding the encoded audio/video streams and generating audio/video signals.

FIG. 2C shows an embodiment of the apparatus when the apparatus is to receive an analog TV broadcast signal. In this embodiment, the present invention can be applied to the timer recording of analog broadcast signals, e.g. the NTSC standard. According to the NTSC standard, every fragment, e.g., two bytes of the program information are inserted are modulated within a predetermined horizontal sync in every vertical sync. FIG. 2C shows a block diagram of a recording/reproduction apparatus that has features of determining the title of recorded program under analog broadcast system. The method described in FIGS. 3A and 3B can be applied in the apparatus of FIG. 2C so that, for the cases illustrated in FIG. 5A and FIG. 6, an appropriate title of the timer-recorded program is chosen and used to provide users with a recorded program list.

Compared to the apparatus of FIG. 2A, the apparatus of FIG. 2C includes a sync signal demodulator 61, a PES encoder 62, and a packetized elementary stream (PES) decoder 63. The sync signal demodulator 61 detects the two-byte fragment that has been modulated in the predetermined sync signal during the vertical sync period and then sends the detected fragment to the microcomputer 30'. The PES encoder 62 converts the incoming broadcast signal into digital data, performs the MPEG encoding of the digital data, packetizes the MPEG-encoded audio and video data, performs muxing the PES, and then supplies the muxed PES to the recording DSP unit 12.

The PES decoder 63 performs reverse function to that of PES encoder 62. The PES decoder 63 demuxs audio and video PES packets from the PES packet sequence, decoding and producing audio and video signals. By formatting the received the incoming two-byte fragments, the microcomputer 30' produces the program time table shown in FIG. 4 which will be used in determining the title of a timed recorded program.

FIGS. 2A-2C illustrate an apparatus for a broadcast signal. As can be appreciated, the apparatuses are exemplary. One of ordinary skill in the art will appreciate the use of the present invention to internet signal (IP) or other type of wired and/or wireless reception and/or transmission. Further, in other types of apparatuses or devices, the hardware functions can be readily implemented in software and/or firmware.

Figure 3A:
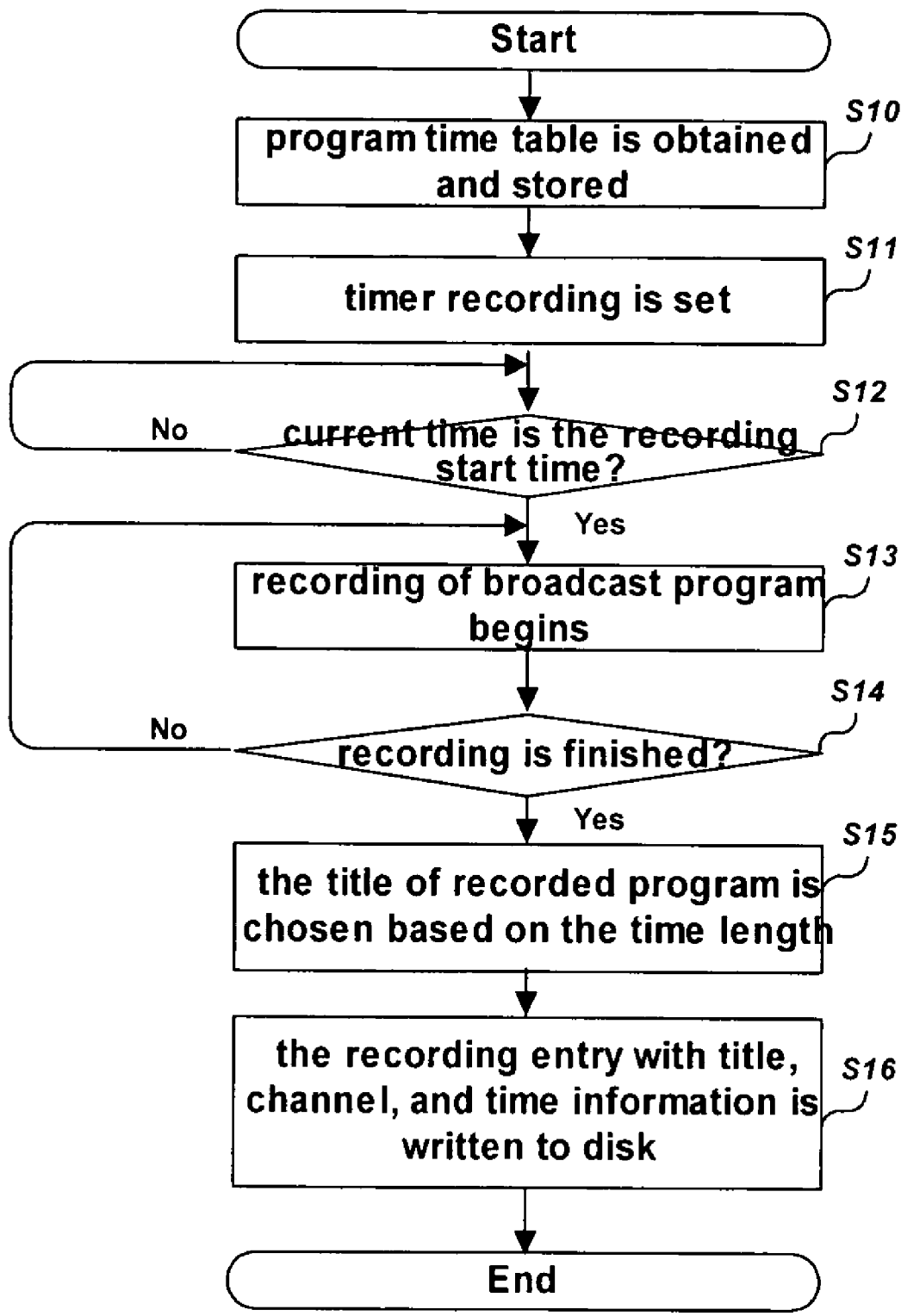
FIGS. 3A and 3B are flowcharts of exemplary methods of determining the title of a recorded program according to the present invention.
Figure 3B:
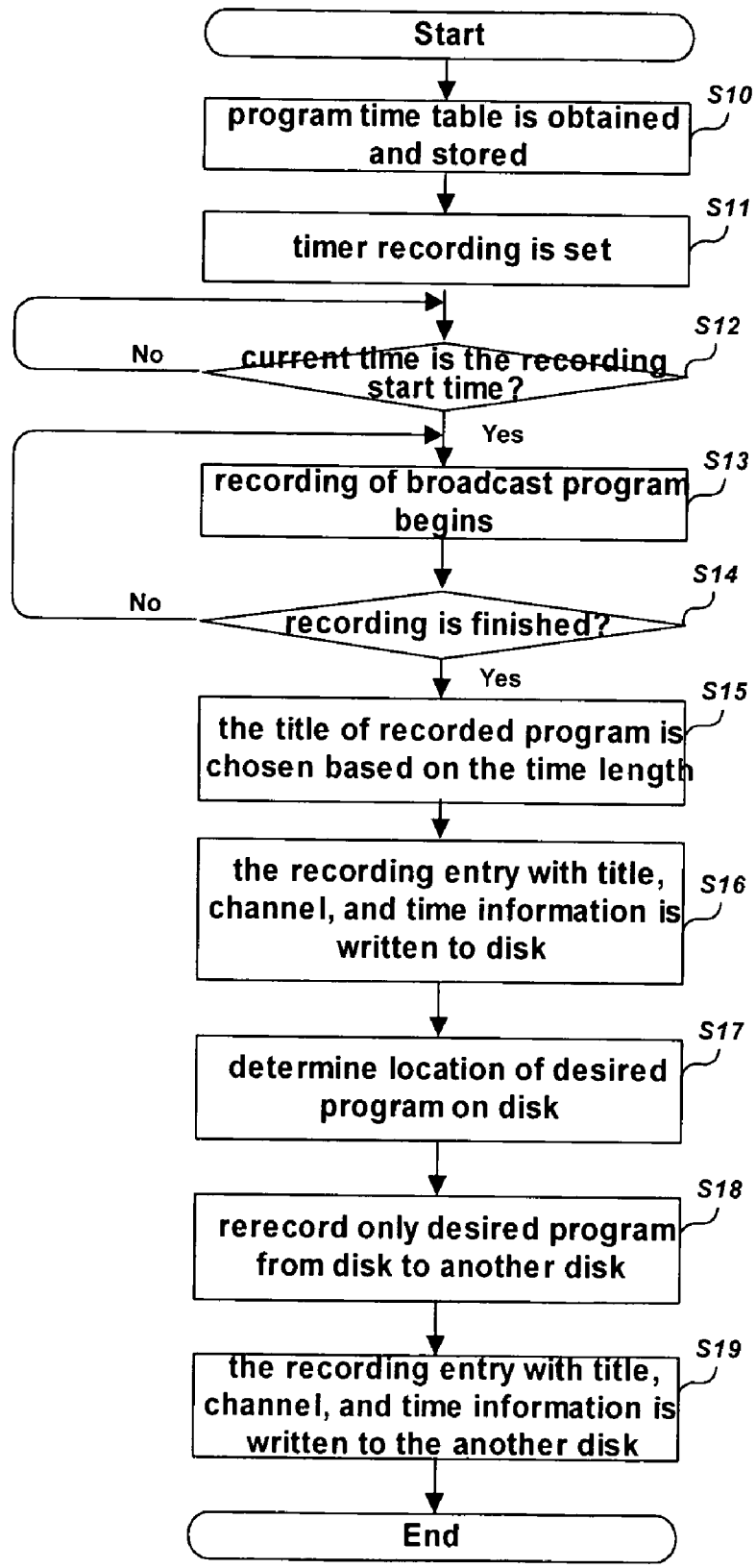

Exemplary methods of determining the title of a recorded program in accordance with preferred embodiments of the present invention, which are shown in FIGS. 3A and 3B, are described below in detail. The various methods may utilize the apparatus of FIGS. 2A, 2B and 2C or others described above. The following description has been tailored to the apparatus of FIG. 2B, but one of ordinary skill in the art will appreciate the application of the present invention to other embodiments disclosed above and the variation thereof.

When power of the apparatus of FIG. 2B is on, and if a desired channel signal is tuned by the tuner 10, the digital demodulator 11 starts to demodulate a transport stream from the tuned channel signal, extracts transport packets (TPs) having a prescribed identification (ID), say, '00' from the transport stream, and sends the data extracted from the TPs to the microcomputer 30. The extracted data includes general information on broadcast programs that are being or will be provided on that channel, for example, titles, the time, and a brief description.

After receiving and collecting the data, the microcomputer 30 makes a program time table for the broadcast programs on the channel and then stores the time table in the memory 32 (S10). If the channel is changed by a user's request, the microcomputer 30 obtains the program time table for the new channel by performing the same operations. FIG. 4 illustrates an example of the program time table. Program time tables for all channels are unnecessary and it is preferred that the program time table for a particular channel is obtained at the time that the channel signal is tuned to perform the timer recording.

As shown in FIG. 4, the program time table for each channel includes the title of the program, the program's start time (ST), the program's end time (ET), and a brief description of the program. For each channel, there are a plurality of programs. In FIG. 4, the end time of one program is shown as the start time of the following program.

Once the program time table is obtained and stored, a user enters channel and broadcast time of a desired program via an input means attached to the apparatus such as remote controller in order to set the timer recording (S11). The timer recording may be set readily, conveniently by way of a graphic user interface (GUI) program that is an embedded program running on the microcomputer 30. The GUI uses graphics and characters that are generated by the OSD unit 33. In case of a remote controller, infrared communication means (not shown) attached to the apparatus, controlled by the microcomputer 30, is used to receive information on the timer recording from the remote controller.

Once the timer recording setting is completed, the apparatus will be in the waiting state until a preset recording start time. In the waiting mode, power is only supplied to components that take charge of keeping track of the current time and determining the on/off request by the user.

The microcomputer 30, in the waiting mode, determines if the current time maintained by the timer 34 approaches the preset recording start time of the timer recording (S12). When the current time is equal to or one or two minutes before the recording start time, the microcomputer 30 supplies power to all of the components, and then makes the tuner 10 tune to the channel on which the desired program is to broadcast. The reason why the channel is tuned prior to recording is so that the program time table of that channel may be obtained before the timer recording, and if needed, recorded. Then, the microcomputer 30 controls the servo unit 31 so that the optical disk 1 rotates at a normal recording speed and/or the hard disk.

The digital demodulator 11 demodulates the program broadcast on the tuned channel into transport packets. From the beginning of the program, the transport packets are converted to ECC data format and are then transformed into recording signals by the DSP unit 12. And then, the signal is written to the disk 1 by means of the optical pick up 2 and the optical driver 13. Optionally, the signal may be first written to the hard disk 40, and later written to the optical disk 1. If desired, the signal may be written to the disk 40 and the optical disk 1 simultaneously. The recording operation is performed until the recording end time specified by the timed recording (S13).

When the current time is equal to the recording end time (S14), the microcomputer 30 stops the recording and then starts the operation of determining the title of the recorded program. To do this, the microcomputer 30 looks up the program time table that is broadcasted on the corresponding channel. Optionally, the program time table may be accessed from the memory 30, which contains the program time table previously stored. With reference to the program time table, the microcomputer 30 searches for all programs whose broadcast time overlap, partly or entirely, with the preset timer recording interval (the recording start time and recording end time). Among the programs found to have overlapping time with the timer recording interval, only one program that has the longest overlapping time interval (running time) may be determined and its title chosen as the title of the recorded program (S15).

For example, in case that the recording start time and the recording end time of timer recording are set to 8:40 and 9:45, respectively and the three programs A, B, C or portions thereof have been recorded, as shown in FIG. 5A, the overlapping intervals between the three programs and the timer recording interval are 10 (for program A), 48 min (for program B), 7 min (for program C), respectively. Because program B has the longest overlapping time interval, the title of program B ("talk show" in FIG. 5A) is obtained from the program time table newly obtained or stored in memory 32 and is determined as the title of the timer recording interval 500.

In another embodiment of the present invention, the title of a recorded program may be determined on the basis of recorded data size on an optical disk or a hard disk, rather than the recorded time interval lengths. In this embodiment, once timer recording begins, by referencing the program time table, the microcomputer 30 determines and stores the program switch times (i.e., times when one program ends and another program begins, 8:50 and 9:38 in FIG. 5A) within the preset timer recording interval. At each of the program switch times or the recording end time, the microcomputer calculates and stores the size of data that have been recorded on the optical disk and/or the hard disk 40 since the preceding program switch time or the recording start time. When the timer recording is finished, the title of recorded program is determined based on the size of the recorded data for each program's recorded interval. For example, as shown in FIG. 5A, the data sizes of the three recorded intervals (8:40 to 8:50, 8:50 to 9:38, 9:38 to 9:45) are stored and denoted by DS1, DS2, and DS3, respectively. Thereafter, a ratio of each recorded data size to the total data size (DS1+DS2+DS3) is calculated. The title of program having the highest ratio is chosen as the title of the timer recorded interval 500.

In another embodiment of the present invention, the title of a recorded program may be determined on the basis of the time location of the timer recording interval in relation to the program switch time, program start time, and/or program end time. For example, once time recording begins, by referencing the program time table, or from the program switches, the microcomputer 30 determines and stores the program switch times within the preset timer recording interval. After the recording end time, and when the timer recording is finished, the title of the recorded program is determined based on the location of the timer recording interval in relation to the recorded switch times. For example, the title of the program broadcasted between two program switch times according to the program time table will be chosen as the title of the timer recording interval containing both of the two program switch times.

As shown in FIG. 5A, program B's starting switch time of 8:50 and ending switch time of 9:38 are contained within the timer recording interval 500. In another example, the name of the program whose switch time occurs first after the start of the timer recording interval may be chosen as the title of the timer recording interval, without regard to the subsequent program switch time. As shown in FIG. 5A, program B's starting program switch time of 8:50 occurs after the recording interval start time of 8:40. Therefore, the timer recording interval 500 may be titled as program B.

Once a title is chosen as mentioned above, the microcomputer 30 forms a recording entry including recording time information, channel, title, and location information about the recorded program, as shown in FIG. 5B, and writes the entry into management information area on the optical disk 1 or the hard disk 40 (S16). The location information can be an index number of the cell containing location information about the recorded interval on the optical disk 1 or the hard disk 40, a filename associated with the recorded interval, or the physical start and end address information. The location information may contain other representations specifying interval information on the optical disk 1 or the hard disk 40.

There may be cases when the timer recording interval does not contain the entirety of one program, but instead, contains two programs. The two programs may have been recorded in their entirety or may both be only partially recorded. If two programs are included in the timer recording interval, the title may be determined by examining whether a ratio of the recording time interval of the second program (i.e., the latter program) to the entire recording interval is greater than a predetermined value. If the ratio is greater than 40%, the title of recorded program is chosen as the title of the second program.

The reason why the title of the second program is chosen even though the ratio is less than 50% is that it is statistically more likely that programs are broadcast by some delay than that programs are broadcast ahead of schedule. In case of delayed broadcasting, the ratios of the two programs become quite equal to each other. For example, in case of FIG. 6, the latter program B has the ratio of 46.2% (=30/65) that is greater than a predetermined value, 40%. Therefore, the title of program B is chosen as the title of the recorded interval 600 and is written into a program entry. If the ratio of the second program is smaller than the predetermined value, 40%, then the title of the first program is determined as the title of recorded interval 600 to notify a user that a large portion of an unwanted program has been recorded.

However, in cases when a delay in broadcast causes recording of undesired programs or cuts off desired programs, as in an exemplary embodiment of the present invention, the timer recording interval may be extended automatically so that a program being recorded is not prematurely cut-off. In this embodiment, by referring to the program time table, or obtaining program switch time, the end time of the timer recording is automatically extended by a given amount, at least to the end of the program, or to the next program switch time, for example.

As shown in FIG. 7, when a regularly scheduled program is delayed and causes a possibility that the timer recording interval 600 (scheduled to end at 9:45) will miss the end of the program B, which is scheduled to end at 10:03, the timer recording interval is extended. In cases when the next program switch time is known, the timer recording interval may be extended by a given amount, or to at least the end of the program B, which is scheduled to end at 10:03. In cases when the next program switch time is unknown, the timer recording interval may be extended by a given amount, say 30 minutes, which will likely allow sufficient time extension to record the entirety of the program being recorded. Alternatively, the extension may be based on the ratio of FIG. 6, where if the ratio is found to be 46.2%, the extension may be 53.8%, i.e., add another 35 minutes of extension.

In another example, if the next program switch time is available from the program time table, then the timer recording interval may be extended until the next program switch time. Alternately, the timer recording interval may be extended until the recorder actually detects the program switch indication from the broadcast. In this case, the recorder stops recording only after detecting the program switch indication. In cases when a program switch indication is used, the indication may be an audible, visible or any detectible signal. In another exemplary embodiment, the recording of the desired program during the timer recording interval may be recorded first to a hard disk, then after the title of the desired program is determined, only the desired program is recorded onto the optical disk. In this case, recording and viewing of undesired truncated programs are reduced, and space utilization of the optical disk is enhanced.

For example, as shown in FIG. 3B, after the recording entry with title, channel, and time information is written to the disk (S16), the microcomputer determines the location of the desired program on the disk (S17). In this case, the disk may be the hard disk 40. Thereafter, the microcomputer 30 rerecords only the desired program on to the another disk (S18), so that undesired portions of the recording are eliminated. In this case, the another disk may be the optical disk 1. Thereafter, title, channel, and time information are also recorded onto the another disk (S19). The microcomputer determines the desired program by choosing only the portion of the timer recording interval that is located between the start and end times of the desired program, for example.

After at least one timer recording is performed, and the title of recorded program is determined the recorded program may be reproduced. During reproduction, the recorded program list is read out from the optical disk 1 or the hard disk 40 upon a user's request of the timer recorded program. The RF signal is read out from the disk 1 by the optical pickup 2, or the hard disk 40 and is then converted into digital data by the RF unit 20 and reproduction DSP unit 21. Among the digital data, management and navigation information (including the recorded program list) is sent to the microcomputer 30 and the A/V data streams are supplied to the demux 22.

Information about the recorded program list is temporarily stored in memory 32 and is then supplied to the OSD signal generator 33 after screen-fitted format manipulation. A desired program entry can be selected among entries in the recorded program list that is displayed on a screen by referencing the titles of recorded programs.

If an entry is chosen, the microcomputer 30 retrieves location information of the chosen entry and then begins to read out the data corresponding to the entry on the optical disk 1 by controlling the servo unit 24 and the optical pickup 2 or the hard disk 40. The data stream being read out is supplied to the demux 22, as mentioned before. Encoded A/V data is selected from the data stream by the demux 22 and is then sent to the A/V decoder 23 so that a user watches the recorded program.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of determining a title of a recorded video content including a plurality of programs on a recording medium, the method comprising:
    recording the plurality of programs on the recording medium during a time interval between a recording start time and a recording end time, wherein both the recording start time and the recording end time are preset in advance by a user;
    determining a ratio between a data size of each recorded program to a data size of the recorded video content on the recording medium in the time interval between the recording start time and the recording end time; and
    selecting the title of the recorded video content based on the recorded program having a greatest ratio of the data size, wherein the selected title is regarded as a title of a recorded video content on the recording medium during the time interval between the recording start time and the recording end time.

2. The method of claim 1, wherein the video content is recorded on the recording medium during a preset time interval.

3. The method of claim 1, wherein the recording medium is an optical disc.

4. The method of claim 3, wherein the optical disc is a DVD+/−R disc.

5. The method of claim 1, wherein the recorded video content is first stored on a hard disk and after selecting the title, the program of the selected title is recorded on an optical disc.

6. The method of claim 5, wherein the recorded video content is deleted from the hard disk after writing on the optical disc.

7. The method of claim 1, wherein the plurality of programs comprises an entire program and at least one portion of a program.

8. The method of claim 1, wherein a recording apparatus obtains, from a received signal, the data size information of each program.

9. The method of claim 1, wherein the programs are at least one of broadcast programs or cable programs.

10. The method of claim 9, wherein the programs are digitally transmitted programs or analog programs.

11. A method of determining a title of a recorded video content including a plurality of programs on a recording medium, the method comprising:
 recording the plurality of programs on the recording medium during a time interval between a recording start time and a recording end time, wherein both the recording start time and the recording end time are preset in advance by a user;
 determining a ratio of a recorded duration of a second program to a preset recording time interval of the recorded video content on the recording medium in the time interval between the recording start time and the recording end time; and
 selecting the title of the recorded video content based on the second program when the ratio between the recorded duration and the preset recording time interval is greater than a prescribed threshold value, wherein the selected title is regarded as a title of a recorded video content on the recording medium during the time interval between the recording start time and the recording end time.

12. The method of claim 11, wherein the recording medium is an optical disc.

13. The method of claim 12, wherein the optical disc is a DVD+/−R disc.

14. The method of claim 11, wherein the plurality of programs comprises first and second portions of first and second programs, respectively.

15. The method of claim 11, wherein a recording apparatus obtains, from a received signal, time information containing an end time of the second program, and if an end time of the preset recording time interval is earlier than the end time of the second program, the recording apparatus overrides the preset recording time interval such that a recording continues to the end until the end time of the second program when the ratio is greater than the prescribed threshold value.

16. The method of claim 11, wherein the programs are at least one of broadcast programs or cable programs.

17. The method of claim 11, wherein the programs are digitally transmitted programs or analog programs.

18. A recording apparatus comprising:
 a receiving circuit that receives signals having program data and program information;
 a recording device that records the signals on a recordable medium;
 a storage device that stores program information; and
 a controller that controls the receiving circuit and the recording device, wherein the controller determines a title of a recorded video content based on at least one of the following:
 (a) recording a plurality of programs on the recordable medium during a time interval between a recording start time and a recording end time, wherein both the recording start time and the recording end time are preset in advance by a user, determining a ratio between a data size of each recorded program to a data size of the recorded video content on the recordable medium in the time interval between the recording start time and the recording end time, and selecting the title of the recorded video content based on the recorded program having a greatest ratio of the data size, wherein the selected title is regarded as a title of a recorded video content on the recordable medium during the time interval between the recording start time and the recording end time, or
 (b) recording a plurality of programs on the recordable medium during a time interval between a recording start time and a recording end time, wherein both the recording start time and the recording end time are preset in advance by a user, determining a ratio of a recorded duration of a second program to a preset recording time interval of the recorded video content on the recordable medium in the time interval between the recording start time and the recording end time, and selecting the title of the recorded video content based on the second program when the ratio between the recorded duration and the preset recording time interval is greater than a prescribed threshold value, wherein the selected title is regarded as a title of a recorded video content on the recordable medium during the time interval between the recording start time and the recording end time.

19. The recording apparatus of claim 18, wherein the receiving circuit receives broadcast signals, and comprises:
 a tuner to receive broadcast signals; and
 a digital demodulator for demodulating the broadcast signals.

20. The recording apparatus of claim 19, wherein the recording device comprises:
 a recording digital signal processor to convert a transport sequence in accordance with an error correction code (ECC) format and modulating the ECC data into record-ready signals;
 an optical driver to receive the record-ready signals and for moving an optical pickup, wherein the optical pickup reads out signals from an optical disk and writes signals from the optical driver to the optical disk;
 an RF unit to produce binary reproduction signals from the read out signal and to generate both a tracking error signal and a focusing error signal;
 a reproduction digital signal processor to generate digital data from the binary reproduction signals;
 a demux unit to demux transport streams from the digital data into encoded audio/video streams and to extract management and navigation information from the digital data;
 a decoder to decode the encoded audio/video streams and to generate audio/video signals; and
 a servo unit to drive the optical disk, to control the optical pickup, and a laser beam of the optical pickup.

21. The recording apparatus of claim 18, wherein the receiving circuit comprises:
 a tuner to receive broadcast signals;
 a sync signal demodulator to detect a two-byte fragment that has been modulated in a predetermined sync signal during a vertical sync period, and to send the detected fragment; and
 a packetized elementary system (PES) encoder to convert the incoming broadcast signals into digital data, to perform MPEG encoding of the digital data, to packetize the MPEG-encoded audio and video data, to perform muxing of the PES, and to supply the muxed PES.

22. The recording apparatus of claim 21, wherein the recording device comprises:
- a recording digital signal processor to convert a transport sequence in accordance with an error correction code (ECC) format and to modulate the ECC data into record-ready signals;
- an optical driver to receive the record-ready signals and for moving an optical pickup, wherein the optical pickup reads out signals from an optical disk and writes signals from the optical driver to the optical disk;
- an RF unit to produce binary reproduction signals from the read out signal and to generate both a tracking error signal and a focusing error signal;
- a reproduction digital signal processor to generate digital data from the binary reproduction signals;
- a PES decoder to demux audio and video PES packets from the PES packet sequence, whereby decoding and producing audio and video signals;
- a decoder to decode the encoded audio/video streams and to generate audio/video signals; and
- a servo unit to drive the optical disk, to control the optical pickup, and a laser beam of the optical pickup.

23. The recording apparatus of claim 18, wherein the controller comprises:
- a microcomputer to process user's requests and perform recording/reproducing control operations; and
- an OSD signal generator for generating character and graphic signals.

* * * * *